United States Patent [19]

Ueno

[11] Patent Number: 4,954,910
[45] Date of Patent: Sep. 4, 1990

[54] RECORDER DISPLAYING RECORDING SHEET QUANTITY AVAILABLE ON REMAINING WEB SHEET SUPPLY

[75] Inventor: Yasuhide Ueno, Fuchu, Japan

[73] Assignee: Canon Kabushiki Kaisha, Tokyo, Japan

[21] Appl. No.: 249,130

[22] Filed: Sep. 26, 1988

[30] Foreign Application Priority Data

Oct. 2, 1987 [JP] Japan .................. 62-250442

[51] Int. Cl.⁵ ............... H04N 1/23; G01D 15/10
[52] U.S. Cl. .................. 358/296; 346/76 PH; 346/136
[58] Field of Search .......... 358/304, 296; 346/136, 346/76 PH; 355/308, 309, 310, 316, 209

[56] References Cited

U.S. PATENT DOCUMENTS

| | | | |
|---|---|---|---|
| 4,503,960 | 3/1985 | Koeleman | 355/309 |
| 4,530,593 | 7/1985 | Kasuya | 355/209 |
| 4,566,547 | 1/1986 | Furukawa | 355/309 |
| 4,707,704 | 11/1987 | Allen | 346/136 |
| 4,734,747 | 3/1988 | Okuda | 355/308 |
| 4,748,479 | 5/1088 | Ohira | 355/311 |

FOREIGN PATENT DOCUMENTS

| | | | |
|---|---|---|---|
| 20470 | 2/1983 | Japan | 346/76 PH |
| 197081 | 11/1983 | Japan | 346/76 PH |

Primary Examiner—Bruce A. Reynolds
Assistant Examiner—Scott Rogers
Attorney, Agent, or Firm—Fitzpatrick, Cella, Harper & Scinto

[57] ABSTRACT

A recorder having a record unit for recording data on a web recording sheet, a detection unit for detecting an amount of the remaining recording sheet, and an output unit for outputting information on the number of pages permitted for further recording based on the amount of the remaining recording sheet detected by the detection unit and a size of information image to be recorded.

6 Claims, 2 Drawing Sheets

RECORDER DISPLAYING RECORDING SHEET QUANTITY AVAILABLE ON REMAINING WEB SHEET SUPPLY

BACKGROUND OF THE INVENTION

1. Field of the Invention

The present invention relates to a recorder which records on a web recording sheet.

2. Related Background Art

In a conventional recorder, the amount of remaining recording sheets is detected by an operator by watching the recording sheets or watching an analog type recording sheet remaining amount indicator.

In the prior art recorder, however, the operator can detect the amount of the remaining recording sheets in a rough analog quantity and cannot known an exact digital quantity which indicates how many further recording operations may be permitted.

The technique of detecting the presence or absence of a recording sheet is disclosed in U.S. patent application Ser. Nos. 024,521 filed on Mar. 11, 1987; 009,071 filed on Jan. 27, 1987; 813,514 filed on Dec. 26, 1985; 156,889 filed on Feb. 17, 1988; and 165,476 filed on Mar. 8, 1988.

SUMMARY OF THE INVENTION

It is an object of the present invention to improve a recorder.

It is another object of the present invention to eliminate the drawback described above.

It is another object of the present invention to allow detection of the exact amount of remaining web recording sheets.

It is another object of the present invention to detect the remaining amount of web recording sheets and to indicate the amount remaining for recording.

It is another object of the present invention to detect the remaining amount of web recording sheets with a simple construction and to indicate the number of remaining for recording.

Other objects of the present invention will be apparent from the following description of the invention.

DETAILED DESCRIPTION OF THE PREFERRED EMBODIMENTS

Figure 1:
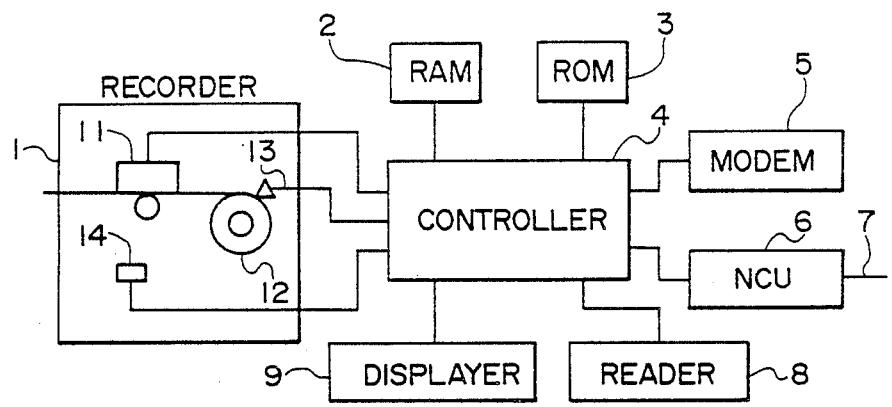
FIG. 1 shows a block diagram of an embodiment of a facsimile machine of the present invention.

FIG. 1 shows a block diagram of an embodiment of a facsimile machine. Numeral 1 denotes a recording unit which records a received image, or the like. Numeral 11 denotes a thermal head which records on a thermal recording sheet (thermal rolled sheet) 12, numeral 13 denotes a sensor for detecting a width of the thermal recording sheet 12, and numeral 14 denotes a switch which is depressed to inform a control unit of the replacement of the thermal recording sheet 12.

Numeral 2 denotes a memory which stores a feed amount of recording sheets, numeral 3 denotes a memory which stores a program for controlling the system, numeral 4 denotes a control unit for controlling the system, numeral 5 denotes a modem for modulating and demodulating data, numeral 6 denotes a network control unit (NCU) for controlling a network, numeral 8 denotes a reader for reading a document, and numeral 9 denotes a display unit for displaying an operation procedure and an error message. The control unit 4 comprises a microcomputer which controls the facsimile machine in accordance with the control program stored in the ROM 3.

Figure 2:
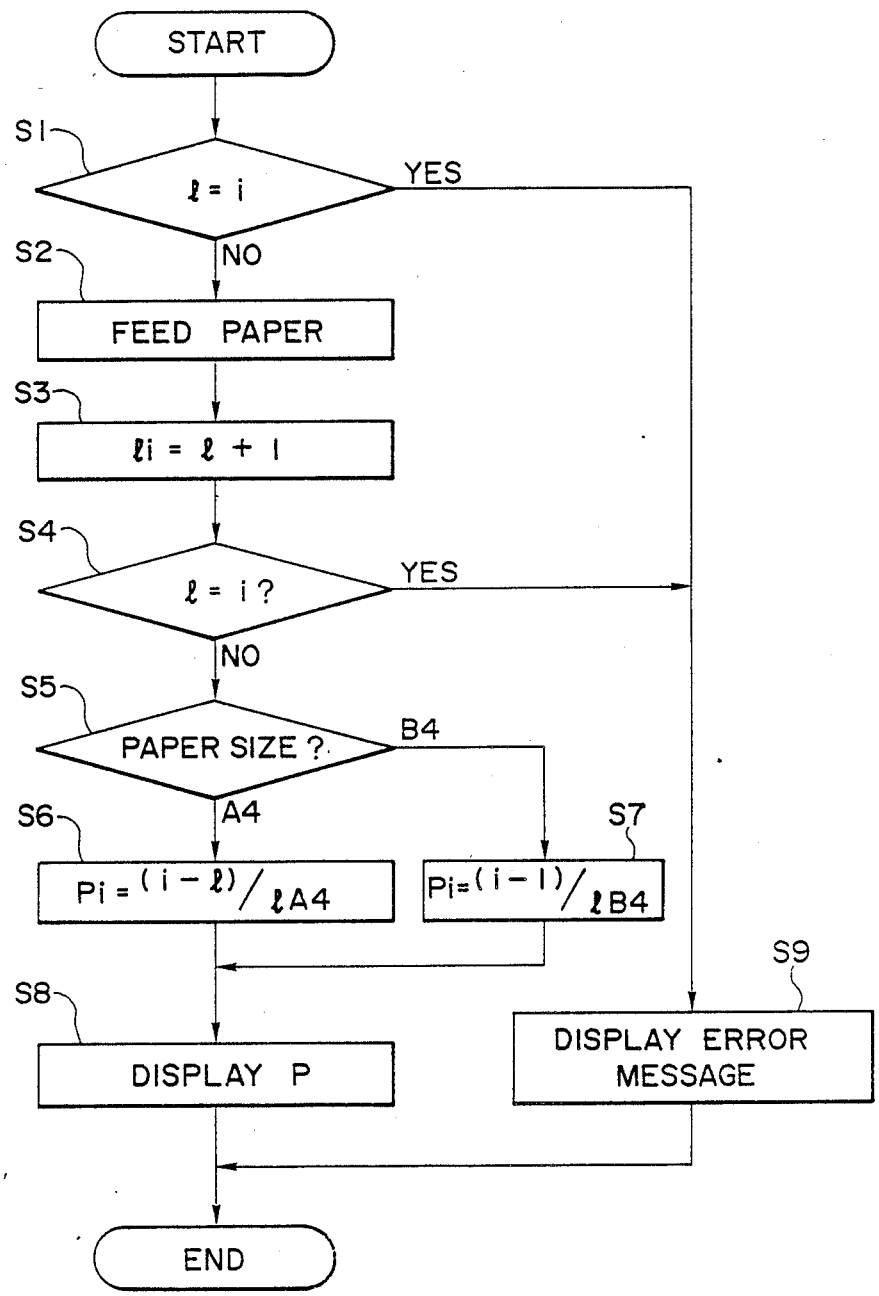
FIG. 2 shows a flow chart of a control operation in the embodiment.

FIG. 2 shows a flow chart of the recording sheet feed operation.

Figure 3:
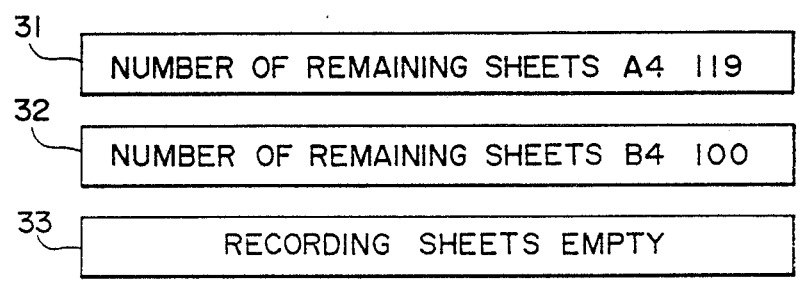
FIG. 3 shows an example of an indication of the amount of remaining recording sheets.

FIG. 3 shows an example of an indication of the amount of remaining recording sheets.

The recording and sheet feed operation is explained with reference to the flow chart of FIG. 2.

In the record unit 1, the received image information or communication is recorded and the sheet is fed in accordance with a command from the control unit 4. In a step S1, the accumulated amount of recording sheets fed l stored in the memory 2 is compared with an initial value for recording sheet feed i. Assuming that the recording sheet is a rolled sheet 30 m long, the initial value is set in "30,000 (mm)". The initial value i varies with the length of the rolled sheet loaded in the record unit 1. If, the step S1, the accumulated amount of recording sheets fed l and the initial value i are equal, it means that a trailing edge of the recording sheet is detected and the sheet is no longer fed. In a step S9, an error indication shown by example 33 (no recording sheet) is displayed by the display unit 9. If the amounts in step S1 are not equal, the recording sheet is fed in a step S2.

In a step S3, the accumulated amount is incremented by one line amount. The one line amount accumulated in the step S3 varies with a pixel density (line density) of a recording. For example, when the line density is 3.85 lines/mm, one line amount is equal to 0.25974, when the line density is 7.7 lines/mm, it is equal to 0.12987; and when the line density is 15.4 lines/mm, it is equal to "0.06494".

In a step S4, a similar comparison to that in step S1 is made. If the amounts are equal, it means that the trailing edge of the recording sheet has been detected, and the error indication of the example 33 is displayed in the step S9. If they are not equal, the control unit 4 determines the width of the recording sheet in a step S5 based on information from the sensor 13 in the recording unit 1. If the recording sheet is of size A4, the number of sheets p permitted for recording is calculated in a step S6, and if the recording sheet is of size B4, it is calculated in a step S7.

"1A4" and "1B4" denote total amounts of standard feed in a longitudinal direction of one page of size A4 and size B4 recording sheets, respectively.

By reducing the accumulated amount l from the initial value i, an estimated amount of remaining recording sheet r is obtained. In the steps S6 and S7, the estimated remaining amount r is divided by the total amounts 1A4 and 1B4, respectively, to produce estimated numbers of remaining sheets p for the respective widths of the recording sheet.

In a step S8, the estimated number of remaining sheets p is displayed on the display unit 9 as shown by example 31 or 32.

In this manner, when the recording and the sheet feeding finished, the latest information on the estimated number of remaining recording sheets p is displayed on the display unit 9.

When the recording sheet is to be exchanged, the accumulated amount of recording sheet feed stored in the memory 2 is reset to "0" by the reset switch 14 in the record unit 1, to initialize it.

In the present embodiment, when the record unit 1 is used, the program is executed in accordance with the flow chart shown in FIG. 2. If the steps 4 et seq of the flow chart are executed even in a waiting state, the estimated number of remaining recording sheets p can be displayed not only during the utilization period but also during the waiting period.

The present embodiment offers the following advantages.

A special sensor to detect the amount of remaining recording sheet is not necessary and the recording unit may be a smaller size.

By the use of the accumulation of the recording sheets fed, the amount of remaining recording sheets can be exactly determined. By displaying the amount of remaining recording sheets with a digital number, the operator can directly and exactly know how many recording sheets remain.

Where the operator is not present at the recorder site e.g., at night, and a large amount of information is to be received, the operator can get exact information to determine if new recording sheets should be loaded before he/she leaves the recorder.

In the present embodiment, the amount of recording sheets fed is accumulated and the accumulation l is compared with the initial value i. Alternatively, the feed amount of the recording sheet may be reduced from the initial value i and the time when the difference reaches "0" may be monitored to attain the same effect as that of the above embodiment.

In the present embodiment, the width of the recording sheet loaded in the record unit 1 is detected by the sensor 13, and the number of sheets remaining for further recording is indicated in accordance with the width of the recording sheet. However, the image information of size A4 may be recorded on the recording sheet (rolled sheet) of size B4. Thus, when the rolled sheet of size B4 is being loaded, the operator may want to know how many sheets of size A4 remain. The operator enters the size of the image information (for example, A4, B4 or B5) by a key entry switch (not shown). Based on the input size information, the total amount of longitudinal feed for that size is read from the memory 2, and the remaining length of the rolled sheet (i-l) is divided by the length of one page of that size, and the number of sheets remaining for recording for the input size is displayed on the display unit 9. In this manner, the operator can detect the number of sheets remaining for recording for any size of sheet, whatever the size of the recording sheet being loaded.

While a facsimile machine is explained in the embodiment, the present invention is not limited to a facsimile machine but is applicable to any machine which uses a continuous sheet (web recording sheet such as rolled sheet).

The present invention is not limited to the embodiment but various modifications may be made.

I claim:

1. A recorder comprising:
   record means for recording data on a web recording sheet;
   detection means for detecting an amount of remaining recording sheet; and
   output means for outputting information on the number of pages remaining for recording in accordance with the amount of remaining recording sheet detected by said detection means and a size of the image to be recorded.

2. A recorder according to claim 1 wherein said record means includes means for feeding the recording sheet, and wherein said detection means detects the amount of remaining sheet based on the fed amount of the recording sheet.

3. A recorder according to claim 1 wherein said size corresponds to a width of the recording sheet.

4. A recorder according to claim 1 wherein said output means displays the information on the number of pages permitted for recording.

5. A recorder comprising:
   feed means for feeding a web recording sheet;
   record means for recording data on said recording sheet;
   memory means for storing recording sheet length information initially set when the recording sheet is loaded;
   detection means for detecting an amount of remaining recording sheet in accordance with the fed amount by said feed means, the amount of remaining recording sheet being detected by reducing the fed amount from the length information stored in said memory means; and
   display means for displaying the amount of remaining recording sheet detected by said detection means.

6. A recorder according to claim 5 wherein said display means displays the number of pages remaining for recording.

* * * * *

UNITED STATES PATENT AND TRADEMARK OFFICE
CERTIFICATE OF CORRECTION

PATENT NO. : 4,954,910
DATED : September 4, 1990
INVENTOR(S) : YASUHIDE UENO

It is certified that error appears in the above-identified patent and that said Letters Patent is hereby corrected as shown below: Title page:

AT [56] REFERENCES CITED

U.S. PATENT DOCUMENTS

"4,748,479 5/1088 Ohira" should read --4,748,479 5/1988 Ohira et al.--.

AT COLUMN 1

Line 17, "known" should read --know--.

Line 39, "of re-" should read --of sheets re- --.

AT COLUMN 2

Line 22, "in" should read --to--.

Line 24, "If, the" should read --If, in--.

Line 37, "0.12987;" should read --0.12987,--.

UNITED STATES PATENT AND TRADEMARK OFFICE
CERTIFICATE OF CORRECTION

PATENT NO. : 4,954,910
DATED : September 4, 1990
INVENTOR(S) : YASUHIDE UENO

It is certified that error appears in the above-identified patent and that said Letters Patent is hereby corrected as shown below:

AT COLUMN 2

Line 39, " "0.06494"." should read --0.06494.--.

Line 66, "finished," should read --are finished,--.

Signed and Sealed this

Twenty-first Day of July, 1992

Attest:

DOUGLAS B. COMER

Attesting Officer

Acting Commissioner of Patents and Trademarks